United States Patent Office 3,631,063
Patented Dec. 28, 1971

3,631,063
1-AMINOALKYL-2,2-DISUBSTITUTED INDOLIN-3-ONES AND A PROCESS FOR THE PRODUCTION THEREFOR
Daniel Lednicer, Portage, Mich., assignor to The Upjohn Company, Kalamazoo, Mich.
No Drawing. Filed May 28, 1969, Ser. No. 828,741
Int. Cl. C07d 27/40
U.S. Cl. 260—326.11
10 Claims

ABSTRACT OF THE DISCLOSURE

Compounds of the formula:

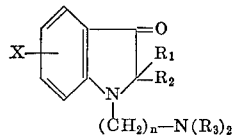

wherein X is hydrogen, lower-alkyl, halogen or —$CF_3$; wherein $R_1$ and $R_2$ are lower-alkyl or —$C_6H_4X'$ in which X' is hydrogen, lower-alkyl, halogen, lower-alkoxy or —$CF_3$; wherein $R_3$ is lower-alkyl or together —$N(R_3)_2$ is 1-pyrrolidinyl, 1-piperidinyl or 4-morpholinyl; and wherein n is an integer from 2 to 4, inclusive, are made from 3H-indol-3-ols. The products as well as their pharmacologically acceptable acid addition salts have sedative activity and can be administered to tranquilize mammals.

BACKGROUND OF THE INVENTION

Field of the invention

This invention is directed to new organic compounds and is particularly concerned wtih novel 1-aminoalkyl-2,2-disubstituted indolin-3-ones, and a process for the production thereof.

SUMMARY OF THE INVENTION

The novel compounds and the process of production therefor can be illustratively represented as follows.

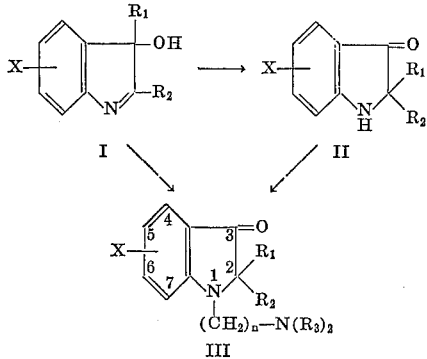

wherein X is selected from the group consisting of hydrogen, alkyl of 1 to 3 carbon atoms, inclusive, halogen and —$CF_3$; $R_1$ and $R_2$ are selected from the group consisting of alkyl, defined as above, and —$C_6H_4X'$ in which X' is selected from the group consisting of hydrogen, alkyl defined as above, alkoxy of 1 to 3 carbon atoms, inclusive, halogen and —$CF_3$; wherein $R_3$ is alkyl defined as above, or, together, the group —$N(R_3)_2$ is selected from the group consisting of 1-pyrrolidinyl, 1-piperidinyl and 4-morpholinyl; and wherein n is an integer from 2 to 4, inclusive.

The process of the invention comprises: treating a 2,3-disubstituted-3H-indol-3-ol (I) with a stronge base to give the 2,2-disubstituted-3-indolinone (II); and treating the 3-indoline one (II) with sodium hydride and a haloamine of the Formula IV:

$$X''(CH_2)_nN(R_3)_2 \qquad (IV)$$

wherein X" is chlorine or bromine, and n, $R_3$ and —$N(R_3)_2$ are defined as herein described above, to give the N-alkylated 3-indolinone (III). Alternatively treating the indolol (I) with sodium hydride and subsequently with the halomine (IV) gives the corresponding substituted indolinone (III).

DESCRIPTION OF THE PREFERRED EMBODIMENTS

Examples of alkyl groups containing from 1 to 3 carbon atoms, inclusive, are methyl, ethyl, propyl and isopropyl.

Examples of alkoxy groups containing from 1 to 3 carbon atoms, inclusive, are methoxy, ethoxy, propoxy and isopropoxy.

The present invention also embraces the organic and inorganic acid addition salts of the novel amino compounds of Formula III particularly the pharmacologically acceptable acid addition salts such as the hydrochlorides, hydrobromides, hydroiodides, sulfates, cyclohexanesulfamates, acetates, propionates, laurates, palmitates, maleates, tartrates, lactates, citrates, as well as other salts, e.g., oxalates, perchlorates, fluosilicates, thiocyanates, trifluoroacetates, trichloroacetates and the like.

The novel compounds of Formula III and the pharmacologically acceptable acid addition salts thereof have sedative and anticonvulsant activity.

Sedative effects were measured by the Chimney test [Med. Exp. 4, 11 (1961)]; the Dish test and the Pedestal test.

Chimney test: The effective intraperitoneal dosage for 50% of mice ($ED_{50}$) is measured in mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings) climb out in a very short time when not treated. When mice remain in the dish for more than 3 minutes, it indicates tranquilization. $ED_{50}$ in mg./kg. (intraperitoneal administration) equals the dose of test compound at which 50% of the mice remain in the dish.

Pedestal test: The untreated mouse leaves the pedestal in less than a minute to climb back to the floor of the standard mouse box. Tranquilized mice will stay more than 1 minute. $ED_{50}$ (intraperitoneal administration) is measured in mg./kg.

Anticonvulsive activity is determined by the Nicotine antagonism test. Mice in groups of 6 are injected intraperitoneally with the test substance. Thirty minutes later the mice, including control (untreated) mice, are injected with 2 mg./kg. of nicotine salicylate. The control mice show overstimulation, i.e., (1) running convulsions followed by (2) tonic extensor fits; followed by (3) death.

The ED$_{50}$ (in mg./kg.) is the effective dosage at which the mouse is protected against (1), (2) or (3).

RESULTS

|  | ED$_{50}$ (mg./kg.) | | | | | |
|---|---|---|---|---|---|---|
|  | CH | Dish | Ped. | Nic (1) | Nic (2) | Nic (3) |
| 1-[2-(1-pyrrolidinyl)ethyl]-2-methyl-2-phenyl-5-chloro-3-indolinone | 63 | 52 | 71 | 200 | 71 | 71 |
| 1-[2-(1-pyrrolidinyl)-ethyl]-2,2-diphenyl-3-indolinone | 178 | 126 | 8 | 200 | 50 | 63 |
| 1-[3-(dimethylamino)-propyl]-2-methyl-2-phenyl-5-chloro-3-indolinone hydroiodide | 45 | 36 | 50 | 100 | 71 | 56 |
| 1-[3-(dimethylamino)-propyl]-2,2-diphenyl-3-indolinone | 35 | 142 | 142 | 200 | 159 | 159 |

NOTE.—CH=Chimney test; Ped.=Pedestal test; Nic=Nicotine antagonism—(1) running convulsions (2) tonic extensor fits, (3) death.

The pharmaceutical forms of compounds III contemplated by this invention include pharmaceutical compositions suited for oral, parenteral and rectal use, e.g., tablets, oils, powder packets, cachets, dragees, capsules, solutions, suspensions, sterile injectable forms, suppositories, bougies, and the like. Suitable diluents or carriers such as carbohydrates (lactose), proteins, lipids calcium phosphate, cornstarch, stearic acid, methylcellulose and the like may be used as carriers or for coating purposes. Oil, e.g., coconut oil, sesame oil, safflower oil, cottonseed oil, peanut oil may be used to prepare solutions or suspensions of the active drug. Sweetening, coloring and flavoring agents may be added.

For mammals and birds food premixes, with starch, oatmeal, dried fishmeat, fishmeal flour and the like can be prepared.

As tranquilizer the compounds of Formula III and the pharmacologically acceptable acid addition salts thereof can be used in dosages of 1 mg.–100 mg./kg. in oral or injectable preparations as described above, to alleviate tension and anxiety in mammals or birds, such as e.g., occurs when animals are in travel.

Other acid addition salts of the compounds of Formula III can be made such as the fluosilicic acid addition salts which are useful mothproofing compounds or the trichloroacetates useful as herbicides against Johnson grass, Bermuda grass, yellow foxtail and green foxtail, and quack grass.

Some of the starting materials I of this invention have been described in the literature. Others can be made from an aminobenzophenone or aminoacetophenone (A). The process consists of acylating the amino group of (A) with an acyl chloride to obtain the corresponding amide (B), to reduce (B), e.g., with sodium borohydride to obtain the corresponding α-hydroxy-α-substituted-o-toluidide (C), to cyclize (C) with hydrogen bromide or sulfuric acid to obtain the benzoxazine (D); to produce the novel ring contraction of (D) in liquid ammonia with sodium amide to give the compound of Formula I. These reactions can be illustratively represented as follows:

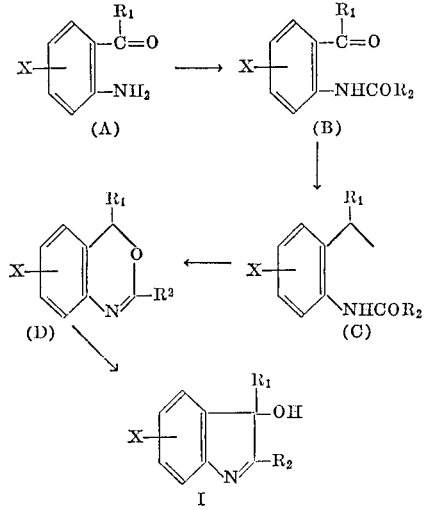

wherein X, R$_1$ and R$_2$ are defined as above.

For carrying out the process of the present invention a selected 3H-indol-3-ol (I) in an organic solvent is admixed with a base dissolved in water. The solvent is an organic, water-miscible solvent, unreactive under the experimental conditions. Alkanols, e.g. methanol ethanol, 1-propanol, 2-propanol, t-butyl alcohol and the like, tetrahydrofuran, and the like are useful solvents. The base is generally sodium or potassium hydroxide dissolved in water. In the preferred embodiment of this reaction, methanol or ethanol is used as solvent; about 0.3 to 2 times of weight of sodium or potassium hydroxide is used compared to the weight of starting material; and the mixture is heated to reflux for 1 to 12 hours. The reaction is operative at temperatures between 40 to 80° C. At the termination of the reaction the mixture is evaporated in vacuo, and the residue suspended in added water is collected on a filter. The thus-obtained product, a 2,2-disubstituted-3-indolinone (II), is purified in conventional manner, e.g., by recrystallization from organic solvents such as ether, methanol, ethanol, ethyl acetate, methylene chloride and the like.

The thus-obtained 3H-indolinone (II) is N-alkylated with sodium hydride and a haloamine compound of the Formula IV $$X''(CH_2)_nN(R_3)_2$$

wherein X'' n and R$_3$ are defined as hereinabove, is added. In the preferred embodiment of this invention the sodium hydride is added in an excess of 5 to 100% of the stoichiometrically required amount and is conveniently used in suspension in mineral oil (56% of NaH) as commercially available. The reaction is carried out in an organic, inert solvent, e.g., dialkyl acid amides such as dimethylformamide, diethylformamide, dimethylacetamide and toluene, benzene, cyclohexane or the like, usually at a temperature between 10 and 50° C. After permitting the reaction mixture to stand from 1 to 30 minutes, the haloamine (IV) of the above formula is added, and the reaction mixture is heated for 2 to 48 hours at reflux. Temperatures between 40° C. and the reflux temperature are operative. Following the termination of the reaction the product is isolated by conventional measures, such as evaporating the solvent or extracting the product and then purifying it by crystallization and recrystallization, often in the form of an acid addition salt such as the hydrochloride, to obtain the compound of Formula III.

Alternatively, the above reaction, i.e., treatment with sodium hydride in dialkylformamide and a hydrocarbon such as benzene toluene, cyclohexane and the like and subsequently with a haloamine (IV) as above can also be carried out with compound (I) to give in one step a compound of Formula III.

The following examples are illustrative of the process and products of the present invention, but are not to be construed as limiting.

EXAMPLE 1

*1-[2-(1-pyrrolidinyl)ethyl]-2,2-diphenyl-3-indolinone*

A solution of 2.85 g. (0.01 mole) of 2,3-diphenyl-3H-indol-3-ol in 15 ml. of dimethylformamide and 80 ml. of benzene was treated with 0.43 g. of sodium hydride (56% NaH in mineral oil). After 5 minutes 2.70 g. of a mixture of 1-(2-chloroethyl)-pyrrolidine and toluene (1:1 by volume) was added. The mixture was brought to reflux (turning to an intense red color) and then kept at reflux for 18 hours (turning yellow). The mixture was cooled, diluted with 80 ml. of benzene, washed with water and brine. The organic layer was then evaporated to dryness and the residue dissolved in ether. To this solution was added an equivalent of 3.7 N hydrogen chloride solution in ether. The hydrochloride thus-formed precipitated and was collected on a filter. The salt was then treated with a slight excess of aqueous sodium hydroxide, the mixture was extracted with ether, the solution evaporated and the residue was twice recrystallized from Skellysolve B hexanes to give 2.10 g. of 1-[2-(1-pyrrolidinyl)ethyl]-2,2-diphenyl-3-indolinone of melting point 132–134° C.

Analysis.—Calcd. for $C_{26}H_{26}N_2O$ (percent): C, 81.64; H, 6.85. Found (percent): C, 81.67; H, 6.90.

EXAMPLE 2

*1-[3-(dimethylamino)propyl]-2,2-diphenyl-3-indolinone*

(A) 2,2-diphenyl-3-indolinone

A solution of 7.1 g. of 2,3-diphenyl-3H-indol-3-ol was heated to reflux with 7 ml. of 50% aqueous sodium hydroxide in 120 ml. of methanol for 6 hours to give 2,2-diphenyl-3-indolinone in 79% yield. After recrystallization from acetone-Skellysolve B hexanes, 2,2-diphenyl-3-indolinone had a melting point of 177–178° C.

Analysis.—Calcd. for $C_{20}H_{15}NO$ (percent): C, 84.18; H, 5.30. Found (percent): C, 84.29; H, 6.36.

(B) 1-[3-(dimethylamino)propyl]-2,2-diphenyl-3-indolinone

A solution of 0.007 mole of 2,2-diphenyl-3-indolinone in 10 ml. of dimethylformamide and 50 ml. benzene was heated with 0.3 g. of sodium hydride (56% NaH in mineral oil). After 10 minutes 0.007 mole of N-(3-chloropropyl)dimethylamine was added and the mixture heated to reflux for 18 hours. The solution was diluted with benzene and washed with water and brine. The organic layer was separated and evaporated to dryness. The resulting residue was dissolved in ether and an equivalent of 3.7 N hydrogen chloride in ether was added. The precipitated solid was collected on a filter. The 1-[3-(dimethylamino)-propyl] - 2,2 - diphenyl-3-indolinone hydrochloride was treated in water with sodium hydroxide. The thus-obtained free base was extracted with methylene chloride, evaporated and the residue recrystallized from Skellysolve B hexanes to give 1-[3-(dimethylamino)propyl]-2,2-diphenyl-3-indolinone of melting point 101–105° C.

Analysis.—Calcd. for $C_{25}H_{26}N_2O$ (percent): C, 81.04; H, 7.07. Found (percent): C, 81.20; H, 7.09.

EXAMPLE 3

*1-[3-(dimethylamino)propyl]-2-methyl-2-phenyl-5-chloro-3-indolinone and hydroiodide thereof*

(A) 2-methyl-2-phenyl-5-chloro-3-indolinone

In the manner given in Example 2A, 2-methyl-3-phenyl-5-chloro-3H-indol-3-ol was reacted with sodium hydroxide to give 2-methyl-2-phenyl-5-chloro-3-indolinone of melting point 154–155.5° C.

Analysis.—Calcd. for $C_{15}H_{12}ClNO$ (percent): C, 69.90; H, 4.70. Found (percent): C, 69.85; H, 5.11.

(B) 1-[3-(dimethylamino)propyl]-2-methyl-2-phenyl-5-chloro-3-indolinone and hydroiodide thereof A solution of 2.63 g. of 2-methyl-2-phenyl-5-chloro-3-indolinone in 15 ml. of dimethylformamide and 75 ml. of benzene was heated with 0.44 g. of sodium hydride (56% NaH in mineral oil). After 10 minutes 2.50 g. of a mixture of N-(3-chloropropyl)dimethylamine and toluene (1:1 by volume) was added. The mixture was maintained at the reflux temperature for 6 hours, cooled, washed with water and brine, and evaporated to dryness. The residue was chromatographed on 250 ml. of silica gel, eluting with 1:1 by volume methylene chloride-benzene mixture (saturated with ammonium hydroxide), and collecting 50-ml. fractions. Fractions 8–15 were combined and evaporated to dryness, and the residue was dissolved in methylene chloride. The solution was washed with 10% aqueous hydriodic acid, and the acid layer was back washed with methylene chloride. The organic layers were combined and evaporated to dryness to obtain a foam which crystallized and was triturated with ethyl acetate. The material was recrystallized twice from methylene chloride-ethyl acetate to obtain 1-[3-(dimethylamino) propyl] - 2 - methyl - 2-phenyl-5-chloro-3-indolinone hydroiodide of melting point 143–146° C.

Analysis.—Calcd. for $C_{20}H_{23}ClN_2O \cdot HI$ (percent): C, 51.02; H, 5.14. Found (percent): C, 51.23; H, 4.94.

The hydroiodide was basified with aqueous sodium hydroxide solution and the mixture was extracted with ether. Evaporation of the extract yielded 1-[3-(dimethylamino)propyl]-2-methyl-2-phenyl-5-chloro-3-indolinone.

EXAMPLE 4

*1-[2-(1-pyrrolidinyl)ethyl]-2-methyl-2-phenyl-5-chloro-3-indolinone*

In the manner given in Example 1, 2-methyl-2-phenyl-5-chloro-3-indolinone (Example 3A) was reacted with sodium hydride and subsequently with 1-(2-chloroethyl)pyrrolidine to give 1-[2-(1-pyrrolidinyl)ethyl]-2-methyl-2-phenyl-5-chloro-3-indolinone of melting point 83.5–86° C.

Analysis.—Calcd. for $C_{21}H_{23}ClN_2O$ (percent): C, 71.07; H, 6.53; N, 7.90. Found (percent): C, 71.38; H, 6.53; N, 7.52.

EXAMPLE 5

*1-[2-(diethylamino)ethyl]-2-methyl-2-phenyl-3-indolinone*

In the manner given in Example 2A, 2-methyl-3-phenyl-3H-indol-3-ol was reacted with sodium hydroxide to give 2-methyl-2-phenyl-3-indolinone of melting point 109–110.5° C.

Analysis.—Calcd. for $C_{15}H_{13}NO$ (percent): C, 80.69; H, 5.87. Found (percent): C, 79.83; H, 5.91.

In the manner given in Example 2B, 2-methyl-2-phenyl-3-indolinone was reacted with sodium hydride and subsequently with N-(2-chloroethyl)dimethylamine to give 1 - [2 - (diethylamino)ethyl] - 2-methyl-2-phenyl-3-indolinone.

EXAMPLE 6

*1-[3-(diisopropylamino)propyl]-2-ethyl-2-(p-tolyl)-6-fluoro-3-indolinone*

In the manner given in Example 2A, 2-ethyl-3-(p-tolyl)-6-fluoro-3H-indol-3-ol was reacted with sodium hydroxide to give 2-ethyl-2-(p-tolyl)-6-fluoro-3-indolinone.

In the manner given in Example 2B, 2-ethyl-2-(p-tolyl)-6-fluoro-3-indolinone was reacted with sodium hydride and subsequently with N-(3-chloropropyl)diisopropylamine to give 1-[3-(diisopropylamino)propyl]-2-ethyl-2-(p-tolyl)-6-fluoro-3-indolinone.

EXAMPLE 7

*1-[2-(1-piperidinyl)ethyl]-2,2-bis(p-methoxyphenyl)-7-trifluoromethyl-3-indolinone*

In the manner given in Example 2A, 2,3-bis(p-methoxyphenyl)-7-trifluoromethyl-3H-indol-3-ol was reacted with sodium hydroxide to give 2,2-bis(p-methoxyphenyl)-7-trifluoromethyl-3-indolinone.

In the manner given in Example 2B, 2,2-bis(p-methoxyphenyl)-7-trifluoromethyl-3-indolinone was reacted with sodium hydride and subsequently with 1-(2-chloroethyl)piperidine to give 1-[2-(1-piperidinyl)ethyl]-2,2-bis(p-methoxyphenyl)-7-trifluoromethyl-3-indolinone.

EXAMPLE 8

*1-[3-(4-morpholinyl)propyl]-2-propyl-2-(o-fluorophenyl)-5-bromo-3-indolinone*

In the manner given in Example 2A, 2-propyl-2-(o-fluorophenyl)-5-bromo-3H-indol-3-ol was reacted with sodium hydroxide to give 2-propyl-2-(o-fluorophenyl)-5-bromo-3-indolinone.

In the manner given in Example 2B, 2-propyl-2-(o-fluorophenyl)-5-bromo-3-indolinone was reacted with sodium hydride and subsequently with 4-(3-chloropropyl) morpholine to give 1-[3-(4-morpholinyl)propyl]-2-propyl-2-(o-fluorophenyl)-5-bromo-3-indolinone.

EXAMPLE 9

*1-[3-(1-piperidinyl)propyl]-2-propyl-2-(m-ethoxyphenyl)-5-ethyl-3-indolinone*

In the manner given in Example 2A, 2-propyl-3-(m-ethoxyphenyl)-5-ethyl-3H-indol-3-ol was reacted with sodium hydroxide to give 2-propyl-2-(m-ethoxyphenyl)-5-ethyl-3-indolinone.

In the manner given in Example 2B, 2-propyl-2-(m-ethoxyphenyl)-5-ethyl-3-indolinone was reacted with sodium hydride and subsequently with 1-(3-chloropropyl) piperidine to give 1-[3-(1-piperidinyl)propyl]-2-propyl-2-(m-ethoxyphenyl)-5-ethyl-3-indolinone.

EXAMPLE 10

*1-[3-(diethylamino)propyl]-2,2-bis(o-bromophenyl)-6-propyl-3-indolinone*

In the manner given in Example 2A, 2,3-bis(o-bromophenyl)-6-propyl-3H-indol-3-ol was reacted with sodium hydroxide to give 2,2-bis(o-bromophenyl)-6-propyl-3-indolinone.

In the manner given in Example 2B, 2,2-bis(o-bromophenyl)-6-propyl-3-indolinone was reacted with sodium hydride and subsequently with N-(3-chloropropyl)diethylamine to give 1-[3-(diethylamino)propyl]-2,2-bis(o-bromophenyl)-6-propyl-3-indolinone.

EXAMPLE 11

*1-[4-(dimethylamino)butyl]-2-isopropyl-2-(p-propoxyphenyl)-5-trifluoromethyl-3-indolinone*

In the manner given in Example 2A, 2-isopropyl-3-(p-propoxyphenyl)-5-trifluoromethyl-3H-indol-3-ol was reacted with sodium hydroxide to give 2-isopropyl-2-(p-propoxyphenyl)-5-trifluoromethyl-3-indolinone.

In the manner given in Example 2B, 2-isopropyl-2-(p-propoxyphenyl)-5-trifluoromethyl-3-indolinone was reacted with sodium hydride and subsequently with N-(4-chlorobutyl)dimethylamine to give 1-[4-(dimethylamino)butyl]-2-isopropyl-2-(p-propoxyphenyl)-5-trifluoromethyl-3-indolinone.

EXAMPLE 12

*1-[4-(1-piperidinyl)butyl]-2,2-bis(p-trifluoromethylphenyl)-4-chloro-3-indolinone*

In the manner given in Example 2A, 2,3-bis(p-trifluoromethylphenyl)-4-chloro-3H-indol-3-ol was reacted with sodium hydroxide to give 2,2-bis(p-trifluoromethylphenyl)-4-chloro-3-indolinone.

In the manner given in Example 2B, 2,2-bis(p-trifluoromethylphenyl)-4-chloro-3-indol inone was reacted with sodium hydride and subsequently with 1-(4-bromobutyl) piperidine to give 1-[4-(1-piperidinyl)butyl]-2,2-bis(p-trifluoromethylphenyl)-4-chloro-3-indolinone.

EXAMPLE 13

*1-[4-(4-morpholinyl)butyl]-2,2-bis(o-fluorophenyl)-5-isopropyl-3-indolinone*

In the manner given in Example 2A, 2,3-bis(o-fluorophenyl)-5-isopropyl-3H-indol-3-ol was reacted with sodium hydroxide to give 2,2-bis(o-fluorophenyl)-5-isopropyl-3-indolinone.

In the manner given in Example 2B, 2,2-bis(o-fluorophenyl)-5-isopropyl-3-indolinone was reacted with sodium hydride and subsequently with 4-(4-chlorobutyl) morpholine to give 1-[4-(4-morpholinyl)butyl]-2,2-bis(o-fluorophenyl)-5-isopropyl-3-indolinone.

EXAMPLE 14

*1-[4-(diisobutylamino)butyl]-2-ethyl-2-(p-trifluoromethylphenyl)-7-bromo-3-indolinone*

In the manner given in Example 2A, 2-ethyl-3-(p-trifluoromethylphenyl)-7-bromo-3H-indol-3-ol was reacted with sodium hydroxide to give 2-ethyl-2-(p-trifluoromethylphenyl)-7-bromo-3-indolinone.

In the manner given in Example 2B, 2-ethyl-2-(p-trifluoromethylphenyl)-7-bromo-3-indolinone was reacted with sodium hydride and subsequently with N-(4-bromobutyl) diisobutylamine to give 1-[4 - diisobutylamino)butyl]-2-(p-trifluoromethylphenyl)-7-bromo-3-indolinone.

EXAMPLE 15

*1-[4-(dimethylamino)butyl-2-isopropyl-2-(o-methoxyphenyl)-7-fluoro-3-indolinone*

In the manner given in Example 1, 2-isopropyl-3-(o-methoxyphenyl)-7-fluoro-3H-indol-3-ol was reacted with sodium hydride and subsequently with N-(3-chlorobutyl) dimethylamine to give 1-[4-(dimethylamino)butyl]-2-isopropyl-2-(o-methoxyphenyl)-7-fluoro-3-indolinone.

EXAMPLE 16

*1-[3-(diethylamino)propyl]-2,2-bis(p-propoxyphenyl)-6-ethyl-3-indolinone*

In the manner given in Example 1, 2,3-bis(p-propoxyphenyl)-6-ethyl-3H-indol-3-ol was reacted with sodium hydride and subsequently with N-(3-chloropropyl)diethylamine to give 1-[3-(diethylamino)propyl]-2,2-bis(p-propoxyphenyl)-6-ethyl-3-indolinone.

EXAMPLE 17

*1-[4-(1-pyrrolidinyl)butyl]-2-methyl-2-(p-propylphenyl)-5-trifluoromethyl-3-indolinone*

In the manner given in Example 1, 2-methyl-3-(p-propylphenyl)-5-trifluoromethyl-3H-indol-3-ol was reacted with sodium hydride and subsequently with 1-(4-bromobutyl)pyrrolidine to give 1-[4-(1-pyrrolidinyl)butyl]-2-methyl-2-(p-propylphenyl) - 5 - trifluoromethyl-3-indolinone.

EXAMPLE 18

*1-[3-(4-morpholinyl)propyl]-2,2-bis(m-ethylphenyl)-4-chloro-3-indolinone*

In the manner given in Example 1, 2,3-bis(m-ethylphenyl)-4-chloro-3H-indol-3-ol was reacted with sodium hydride and subsequently with 4-(3-bromopropyl)morpholine to give 1-[3-(4-morpholinyl)propyl]-2,2-bis(m-ethylphenyl)-4-chloro-3-indolinone.

In the manner given in Examples 1 or 2, from 2,3-substituted-3H-indol-3-ols (I) other 1,2,2 - trisubstituted-3-indolinones of Formula III can be prepared. Representative compounds, thus obtained, include:

1-[2-(4-morpholinyl)ethyl]-2,2-diphenyl-4-bromo-3-indolinone;

1-[3-(1-pyrrolidinyl)propyl]-2,2-bis(o-bromophenyl)-5-chloro-3-indolinone;

1-[4-(1-piperidinyl)butyl]-2-methyl-2-(o-chlorophenyl)-3-indolinone;

1-[2-(dimethylamino)ethyl]-2,2-bis(p-ethylphenyl)-4-propyl-3-indolinone;

1-[3-(dimethylamino)propyl]-2,2-bis(o-methylphenyl)-3-indolinone;

1-[4-(dimethylamino)butyl]-2-propyl-2-phenyl-4-fluoro-3-indolinone;

1-[3-(diethylamino)propyl]-2-ethyl-2-(o-bromophenyl)-5-chloro-3-indolinone;

1-[4-diethylamino)butyl]-2-propyl-2-(m-fluorophenyl)-6-bromo-3-indolinone;
1-[4-dipropylamino)butyl]-2-methyl-2-(p-bromophenyl)-7-trifluoromethyl-3-indolinone;
1-[4-(diisopropylamino)butyl]-2,2-bis(p-bromophenyl)-7-bromo-3-indolinone;
1-[2-(diethylamino)ethyl]-2,2-dimethyl-3-indolinone, and the like.

I claim:
1. A 3-indolinone compound of the formula

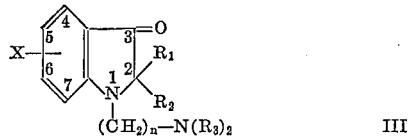

wherein X is selected from the group consisting of hydrogen, alkyl of 1 to 3 carbon atoms, inclusive, halogen and —$CF_3$; $R_1$ and $R_2$ are selected from the group consisting of alkyl, defined as above, and —$C_6H_4X'$ in which X' is selected from the group consisting of hydrogen, alkyl defined as above, alkoxy of 1 to 3 carbon atoms, inclusive, halogen and —$CF_3$; wherein $R_3$ is alkyl defined as above, or, together, the group —$N(R_3)_2$ is selected from the group consisting of 1-pyrrolidinyl, 1-piperidinyl and 4-morpholinyl; and wherein $n$ is an integer from 2 to 4, inclusive, and pharmacologically acceptable acid addition salts thereof.

2. The compound according to claim 1 wherein X is 5-chloro, $R_1$ is methyl, $R_2$ is phenyl, $n$ is 2 and —$N(R_3)_2$ is 1-pyrrolidinyl, and the compound is therefore 1-[2-(1-pyrrolidinyl)ethyl]-2-methyl-2-phenyl-5-chloro - 3 - indolinone.

3. The compound according to claim 1 wherein X is hydrogen, $R_1$ and $R_2$ are phenyl, $n$ is 2 and —$N(R_3)_2$ is 1-pyrrolidinyl and the compound is therefore 1-[2-(1-pyrrolidinyl)ethyl]-2,2-diphenyl-3-indolinone.

4. The compound according to claim 1 wherein X is 5-chloro, $R_1$ is methyl, $R_2$ is phenyl, $n$ is 3 and $R_3$ is methyl and the compound is therefore 1-[3-(dimethylamino)propyl]-2-methyl-2-phenyl-5-chloro-3-indolinone.

5. The hydroiodide of the compound of claim 4.

6. The compound according to claim 1 wherein X is hydrogen, $R_1$ and $R_2$ are phenyl, $n$ is 3 and $R_3$ is methyl, and the compound is therefore 1 - [3 - (dimethylamino) propyl]-2,2-diphenyl-3-indolinone.

7. A pocess for the production of a 3-indolinone compound of the formula

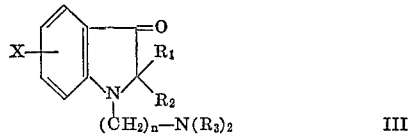

wherein X is selected from the group consisting of hydrogen, alkyl of 1 to 3 carbon atoms, inclusive, halogen and —$CF_3$; $R_1$ and $R_2$ are selected from the group consisting of alkyl, defined as above, and —$C_6H_4X'$ in which X' is selected from thhe group consisting of hydrogen, alkyl defined as above, alkoxy of 1 to 3 carbon atoms, inclusive, halogen and —$CF_3$; wherein $R_3$ is alkyl defined as above, or together, the group —$N(R_3)_2$ is selected from the group consisting of 1-pyrrolidinyl, 1-piperidinyl and 4-morpholinyl; and wherein $n$ is an integer from 2 to 4, inclusive, which comprises:

Heating to 40–80° C. in an organic water-miscible solvent a selected 2,3-disubstituted 3H-indol-3-ol of the Formula I

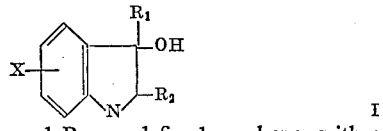

wherein X, $R_1$ and $R_2$ are defined as above, with a strong base selected from the group of sodium or potassium hydroxide to give the corresponding 2,2-disubstituted 3-indolinone II

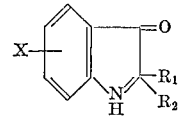

wherein X, $R_1$, and $R_2$ have the significance as above;
Treating II with sodium hydride at a temperature between 10 to 50° C. in an inert organic solvent selected from the group consisting of dimethylformamide, diethylformamide, dimethylacetamide, toluene, benzene and cyclohexane, adding a haloamine of the formula IV:

$$X''(CH_2)_nN(N_3)_2$$

wherein X" is chlorine or bromine, and $n$, $R_3$ and —$N(R_3)_2$ are defined as herein above, and heating the reaction mixture to reflux to give the N-alkylated-3-indolinone of Formula III above.

8. The process of claim 7, wherein the 3H-indol-3-ol is 2,3-diphenyl-3H-indol-3-ol, the haloamine IV is N-(3-chloropropyl)-dimethylamine and the product is 1-[3-(dimethylamino)propyl]2,2-diphenyl-3-indolinone.

9. A process for the production of a 3-indolinone compound of the formula:

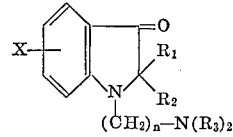

wherein X is selected from the group consisting of hydrogen, alkyl of 1 to 3 carbon atoms, inclusive, halogen and —$CF_3$; $R_1$ and $R_2$ are selected from the group consisting of alkyl, defined as above, and —$C_6H_4X'$ in which X' is selected from the group consisting of hydrogen, alkyl defined as above, alkoxy of 1 to 3 carbon atoms, inclusive, halogen and —$CF_3$; wherein $R_3$ is alkyl defined as above, or, together, the group —$N(R_3)_2$ is selected from the group consisting of 1-pyrrolidinyl, 1-piperidinyl and 4-morpholinyl; and wherein $n$ is an integer from 2 to 4, inclusive, which comprises: treating with sodium hydride at a temperature between 10 to 50° C. in an inert organic solvent selected from the group consisting of dimethylformamide, diethyl-formamide, dimethylacetamide, toluene, benzene and cyclohexane, a 3H-indol-3-ol of the Formula I

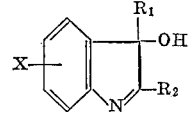

wherein $R_1$, $R_2$, and X are defined as above, with sodium hydride and subsequently adding a haloamine of the Formula IV $$X''(CH_2)_nN(R_3)_2 \quad (IV)$$

wherein X" is chlorine or bromine, and $n$, $R_3$ and —$N(R_3)_2$ are defined as herein above and heating the reaction mixture, to give the N-alkylated -3-indolinone of Formula III above.

10. The process of claim 9, wherein the starting 3H-indol-3-ol is 2,3-diphenyl-3H-indol-3-ol, the haloamine is 1-(2-chloroethyl)pyrrolidine and the end product is therefore 1-[2 - (1-pyrrolidinyl)ethyl]-2,2-diphenyl-3-indolinone.

References Cited

UNITED STATES PATENTS 3,346,571  10/1967  Spatz et al. __ 260—326.12 (X)

ALEX MAZEL, Primary Examiner
J. A. NARCAVAGE, Assistant Examiner

U.S. Cl. X.R.

260—247.5 B, 294.7 G, 236.15; 424—248, 267, 274

UNITED STATES PATENT OFFICE
CERTIFICATE OF CORRECTION

Patent No. 3,631,063          Dated   December 28, 1971

Inventor(s)  Daniel Lednicer

It is certified that error appears in the above-identified patent and that said Letters Patent are hereby corrected as shown below:

Column 1, line 12: for "DISCLOSURE" read -- INVENTION --; line 36, for "wtih" read -- with --. Column 2, line 8, for "3-indoline" read --3-indolin --; line 16, for "halomine" read -- haloamine --. Column 3, line 28, for "fishmeal flour" read -- fishmeal, flour --; Formula (C), should read as shown below instead of as in the patent

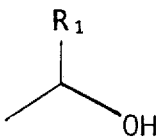

Column 4, line 38, for "X'' n" read -- X", n --. Column 7, line 5, for "-2-(o-" read -- -3-(o- --. Column 8, line 3, for "(4-chlorobutyl" read -- (4-chlorobutyl) --; line 17, for "butyl]-2-(p-" read -- butyl]-2-ethyl-2-(p- --. Column 9, line 1, for "[4-diethylamino)" read -- [4-(diethylamino) --; line 3, for "[4-dipropylamino)" read -- [4-(dipropylamino) --.

Signed and sealed this 1st day of August 1972.

(SEAL)
Attest:

EDWARD M. FLETCHER, JR.           ROBERT GOTTSCHALK
Attesting Officer                 Commissioner of Patents